Jan. 20, 1959 R. R. TARBUCK 2,869,684

TAPE FEEDING SYSTEM

Filed Aug. 5, 1954 2 Sheets-Sheet 1

INVENTOR.
ROBERT R. TARBUCK

BY Leo Wilder

ATTORNEY

Jan. 20, 1959 R. R. TARBUCK 2,869,684

TAPE FEEDING SYSTEM

Filed Aug. 5, 1954 2 Sheets-Sheet 2

INVENTOR.
ROBERT R. TARBUCK

BY Leo Wilder

ATTORNEY

United States Patent Office 2,869,684

Patented Jan. 20, 1959

2,869,684

TAPE FEEDING SYSTEM

Robert R. Tarbuck, West Chester, Pa., assignor to Burroughs Corporation, Detroit, Mich., a corporation of Michigan Application August 5, 1954, Serial No. 447,990

5 Claims. (Cl. 188—78)

This invention relates to tape feeding system, and more particularly to a system wherein the tape is maintained within controlled limits of tension at all times.

In its simplest form, the conventional tape feeding system comprises a supply reel upon which the tape is initially wound, and a positively driven take-up reel to which the leading edge of the tape is attached. One or more idler pulleys may be interposed between the two reels for the purpose of leading the tape over a complex path. As the take-up reel is driven, the tape is led off the supply reel, and after traveling across the path defined by the idler pulleys is wound on to the take-up reel. It should be noted that the supply reel is normally free wheeling, and is caused to rotate by the tension in the tape as the latter is wound on to the take-up reel.

For so long as the take-up reel in the above described apparatus is driven at a constant rate, the system has no apparent shortcomings. However, when the take-up reel is decelerated, the inertia of the supply reel causes the latter to continue rotating at a substantially constant angular velocity. Under such circumstances, the tape is wound off the supply reel at a faster rate than it is being wound on to the take-up reel, resulting in the creation of excessive and uncontrolled slack in the tape. Such condition usually leads to a diminishment in the efficiency of operation of the device with which the tape feeding system is associated, and quite frequently to the jamming of its various components. Additionally, rupture of the tape itself is a common result of the presence of excess slack, the latter condition being due to the impact loading of the tape resulting from an acceleration of the take-up reel subsequent to an antecedent deceleration.

It has accordingly been proposed that the supply reel be provided with a braking device which will cause it to follow the motion of the take-up reel. Those braking systems heretofore available have had various shortcomings. Some were inflexible in their operation, causing the supply reel to decelerate excessively on some occasions and insufficiently on others. Other brakes "grab," causing an abrupt deceleration of the supply reel which frequently results in the rupture of the tape. Additionally, many systems are excessively complex in their mode of operation, expensive to fabricate and difficult to install and maintain.

Accordingly, it is the primary object of the present invention to provide a tape feeding system embodying means for maintaining the tension in the tape within predetermined limits regardless of the rate or variations in rate at which the take-up reel is being operated.

An additional object of the invention is to provide a tape feeding system with means for automatically and abruptly bringing the supply reel to a halt if the tape fortuitously breaks.

A further object of the invention is to provide a tape feeding system which is relatively simple in structure and mode of operation and which will nevertheless tend to maintain a predetermined degree of tension in the tape.

For a greater appreciation of these and other objects of the invention, reference is made to the following specification and accompanying drawings wherein.

Figure 1:
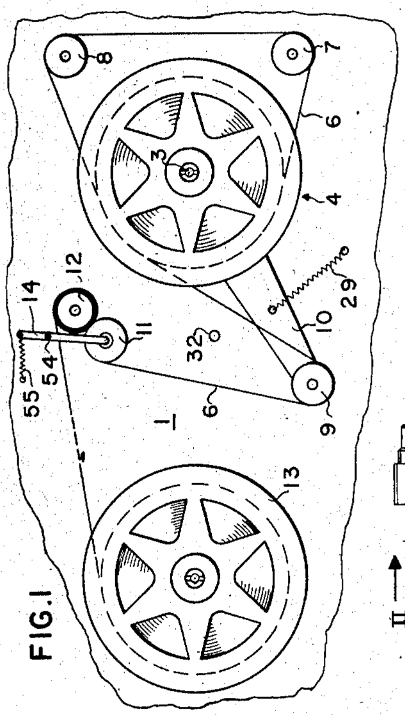
Fig. 1 is a diagrammatic view of a tape feeding system constructed in accordance with the instant invention.

Referring now more particularly to the drawings, the numeral 1 designates a mounting plate having a boss 2 in which shaft 3 of supply reel 4 is rotationally mounted by means of ball bearings 5. The tape 6 is led off the supply reel and passed about idler pulleys 7 and 8 which are mounted on plate 1. The tape is then again passed over an arcuate portion of the supply reel which is employed as an additional bearing point, and then under free wheeling pulley 9 mounted on the outboard end of sensing arm 10 which, at its inboard end is screw connected to hub 19. The hub, and therefore the arm, is rotationally mounted on shaft 3 by means of ball bearings 20, the arm thus being pivotally mounted for swinging movement about the axis of rotation of the supply reel 4. From pulley 9 the tape is led between spring pressed pulleys 11 and 12 and then to take-up reel 13. The take-up reel may be driven by conventional means, either directly by an electric motor or through a transmission such as gearing or belting. It should be noted that while pulley 12 is mounted directly on plate 1, pulley 11 rotates about a transverse shaft attached to lever 14, the latter being pivotally connected intermediate its ends to plate 1 at 54. Spring 55 having one of its ends fixed to the plate and its opposite end attached to the outboard extremity of lever 14 urges the latter in a counterclockwise direction so as to compel an intimate engagement between pulleys 11 and 12 and the tape which passes therebetween.

Figure 3:
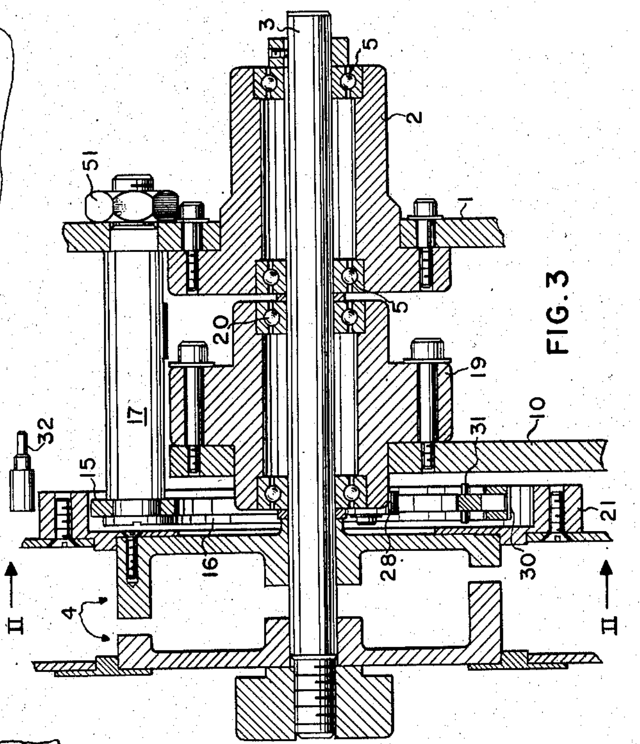
Figs. 3 and 4 are sectional views taken respectively on lines III—III and IV—IV of Fig. 2; and, Fig. 5 is an exploded perspective view of the supply reel and its associated braking system.
Figure 2:
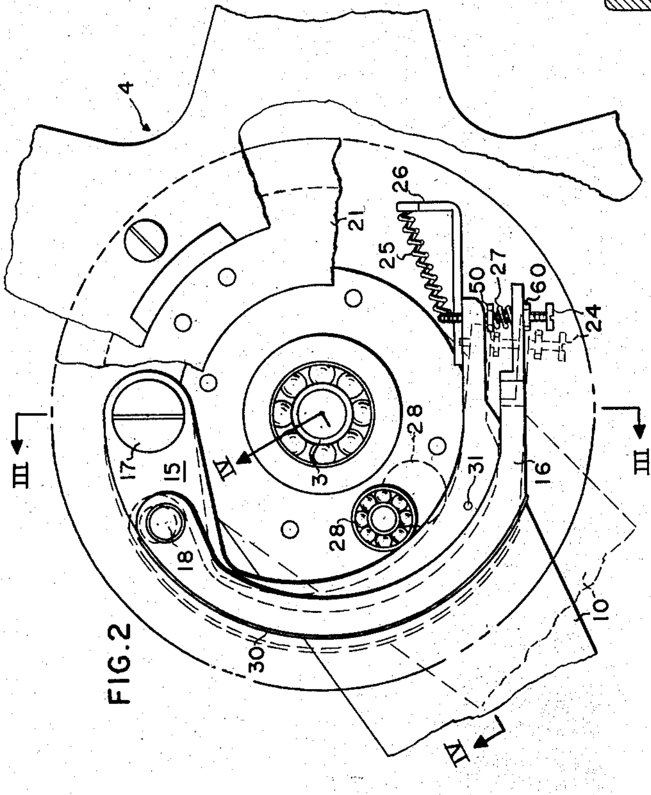
Fig. 2 is a fragmentary view to an enlarged scale, partially in section and partially in phantom, of the hub portion of the supply reel, illustrating the compound brake lever and related elements.
Figure 4:
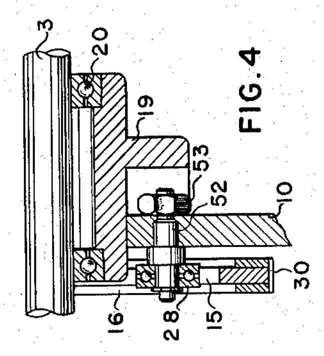
Figure 5:
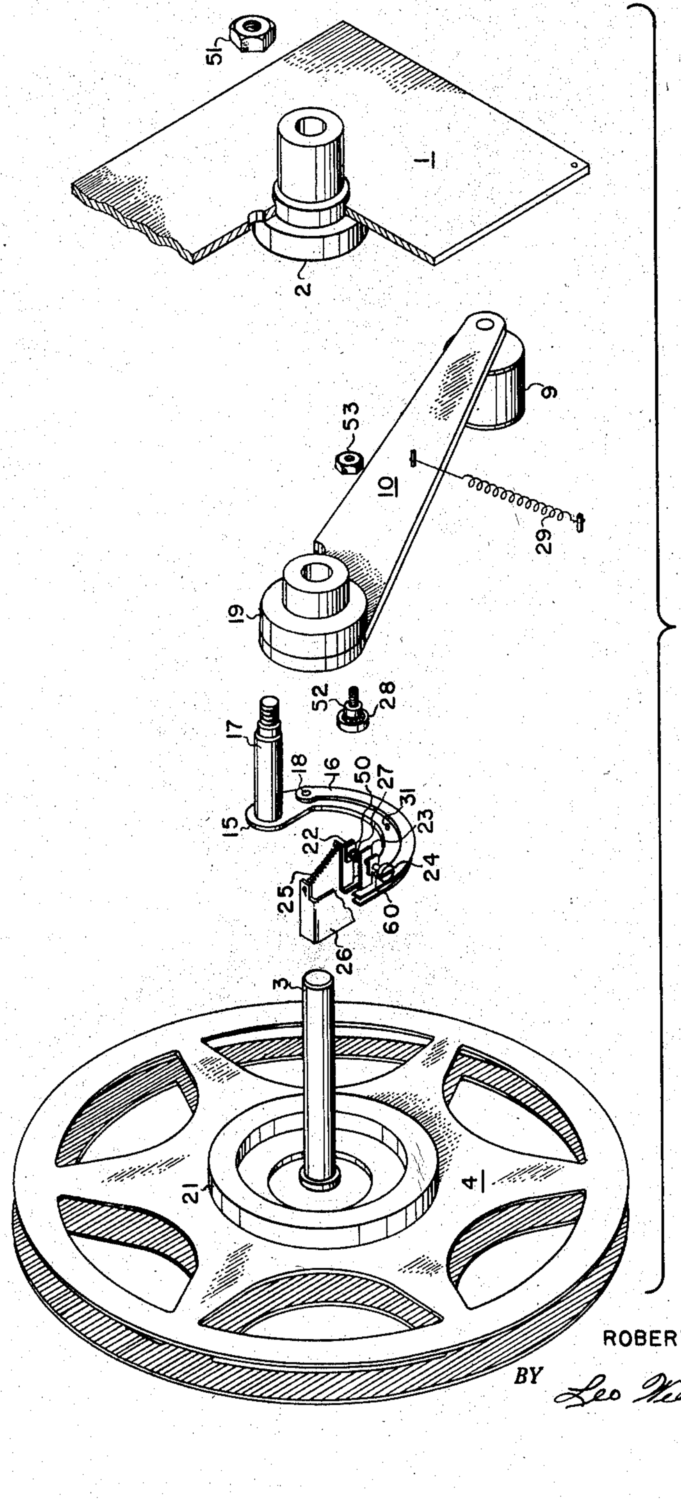

Referring now more particularly to Figs. 2, 3, and 5, it will be noted that the brake comprises a compound element having a major brake lever 15 and a minor brake lever 16, with lever 15 being pivotally attached to plate 1 by means of an integral stud 17 and nut 51. The minor lever which is bifurcated and of an elongated arcuate configuration is pivoted directly on the major lever at 18 with the major lever being interposed within the bifurcation. The compound element fits snugly within the brake drum 21, the latter being bolted to the hub of the supply reel 4 as is best illustrated in Figs. 3 and 5. As is clearly indicated in Fig. 5, both the major and minor levers terminate in upstanding ears, 22 and 23 respectively, which are arranged in parallelism with one another. Adjustment screw 24 passes through ear 23 and is threaded into ear 22, passing completely through the latter so as to enable its end to act as an anchor for spring 25 which is also attached to bracket 26 mounted on plate 1. The spring urges the compound element inwardly away from the inner surface or brake drum drum 21. Spring 27 concentric with the adjustment screw is interposed between ear 23 and stop nut 50 mounted on screw 24 so as to urge the major and minor levers apart for a purpose to be hereinafter explained.

Ball bearing roller 28 which rides on the inner arcuate cam surface of major lever 15 is carried on shaft 52 which in turn is mounted on sensing arm 10 by means of nut 53. It should be noted that the cam surface is eccentric to shaft 3 on which the arm is pivotally mounted, as was hereinbefore stated. Spring 29 having one of its ends anchored to arm 10 and its opposite end fixed to plate 1 as is best seen in Fig. 1, tends to rotate the arm and therefore follower 28 in a counterclockwise direction about the supply reel axis.

With the tape feeding system operating properly, the tape being under tension urges sensing arm 10 in a clockwise direction, just balancing out the counterclockwise force of spring 29 at that point where roller 28 loosely engages the inner cam surface of major lever 15. If take-up reel 13 is decelerated, with the resultant diminution of the magnitude of the tension in the tape, arm 10 and its roller 28 will be caused to rotate in a counterclockwise direction, from the solid line to the broken line position in Fig. 2. The compound braking element will, as a result, be urged outwardly by roller 28, causing a frictional facing 30 such as leather on the outer surface of the minor lever 16 to impinge upon the inner surface of brake drum 21, applying a frictional braking force thereto. Because of the resilient connection 27 between the major and minor levers, the braking force will be applied gradually, progressively increasing in magnitude as the spring is compressed by lever 15, the latter being forced outwardly by roller 28. Such procedure prevents "grabbing" and the inadvertent application of an impact load to the tape. As the supply reel decelerates due to the application of the braking force, the tension in the tape increases and as a result causes the arm 10 to rotate in a clockwise direction so as to relieve the pressure on the compound element. With the pressure relieved, the compound element tends to return to its normal position under the urging of spring 25. However, because of the presence of spring 27, the braking pressure itself is relieved at a very gradual rate. This procedure prevents excessive "hunting" and the repeated and spasmodic application of the braking force. As a further precautionary measure, a positive stop 32 is provided on plate 1 in order to prevent the excessive rotation of sensing arm 10 in a clockwise direction as the tension in the tape builds up.

Additionally, and because of the adjustability provided by screw 24, the amount of slack necessary to cause the application of a braking force to the supply reel may be varied with facility. By rotating the stop nut 60, mounted on screw 24 outboard of ear 23, outwardly so as to further separate the major and minor levers, the braking force will be applied when only a relatively slight amount of slack exists in the tape. Conversely, when the nut 60 is moved inwardly, a relatively greater amount of slack must exist in the tape before the braking force will be applied. This situation arises because the degree of rotation of the roller and therefore the outward movement of the levers vary directly as the slack in the tape. By changing the radial distance between the inner surface of the major lever and the leather facing on the outer surface of the minor lever, the amount of outward movement of the levers necessary to bring the leather facing into contact with the drum is changed. As this outward movement is dependent upon the degree of slack existent in the tape, it may therefore be seen that by rotating the nut so as to change the distance between the inner surface of the major lever and the leather facing on the outer surface of the minor lever, the amount of slack in the tape necessary to cause the application of the braking force is changed. In addition, and by utilizing the nut 50 on screw 24 the magnitude of the applied braking force may be varied. By turning down on the nut, spring 27 may be pre-stressed so as to increase the force. Alternatively, the pressure on the spring may be relieved and therefore, the braking force decreased by backing off the nut.

Further, provision is also made for the direct and rapid application of a positive braking force to the supply reel when the slack in the tape becomes excessive, for example, when the tape breaks. It should be recalled that the minor lever is bifurcated with the major lever extending into the space between the two arms thereof. Normally, and as spring 27 is being compressed, the major lever extends further and further into the space, but the force itself is transmitted from the major to the minor lever via spring 27. However, when the major lever has moved outward with respect to the minor lever to the point where its outer surface is contacting the inner surface of the leather facing, laterally extending pin 31 integral with the major lever abuts the inner surface of lever 16. The leather facing now has a solid backing throughout, and the braking force is transmitted to it by rigid members, pin 31 being utilized for force transmission at this point. It should be obvious that a greater force may be applied more rapidly in this manner than if reliance were placed exclusively upon a resilient member. As a result, the supply wheel is rapidly brought to a halt, preventing the unwinding of an excessive amount of tape.

It may, therefore, be seen that by utilizing a tape feeding system constructed in accordance with the instant invention, the tension in the tape may be maintained within the desired limits with facility. The tensile condition of the tape itself directly determines when and to what extent the braking force shall be applied. Further, through the interposition of a resilient member in the braking element, the application and removal of the force is gradual, preventing both excessive "hunting" and "grabbing." Additionally, because of the incorporated adjustability of the system, the degree of slackness necessary to cause brake application may be varied with facility to suit the unique needs of the particular device or process for which the feeding system is being utilized. Another feature of the present invention is the rapid and positive application of a braking force of large magnitude to the supply reel so as to rapidly bring it to a halt when the slack in the tape becomes unwarrantedly excessive. Such procedure prevents the jamming of the device so frequently caused heretofore by the presence of an excessive amount of loose and uncontrolled tape in the system.

Having thus disclosed an exemplary embodiment thereof, what I claim as my invention is:

1. A braking system for a rotational member comprising, an arm pivotally mounted for rotation about the axis of said rotational member and relative to said rotational member, a roller on said arm, and braking means for said rotational member, said braking means including a drum fixed to said rotational member and also including a compound element having a plurality of levers, one of said levers being pivotally mounted about a fixed axis and having a cam track eccentric to and in the same plane as the path of movement of said roller when said arm is rotated, another of said levers being pivotally connected to the first mentioned lever and interposed between said lever and the drum, compressive resilient means interposed between and connected to the levers, the above mentioned roller riding on the cam track of the first mentioned lever and motivating said lever toward the drum in response to the rotation of the arm in a specified direction, the operative connections between the levers and the resilient means being such that the motivating force is transmitted from the first mentioned lever to the second mentioned lever primarily through the resilient means so as to cause the application of a gradually increasing braking force to the drum by the second mentioned lever.

2. A braking system for a rotational member comprising, an arm pivotally mounted for rotation about the axis of said rotational member and relative to said rotational member, a roller on said arm, and braking means for said rotational member, said braking means including a drum fixed to said rotational member and also including a compound element having a plurality of levers, one of said levers being pivotally mounted about a fixed axis and having a cam track eccentric to and in the same plane as the path of movement of said roller when said arm is rotated, another of said levers being pivotally connected to the first mentioned lever and interposed between said lever and the drum, compressive resilient means interposed between and connected to the levers, the above mentioned roller riding on the cam track of the first mentioned lever and motivating said lever toward the drum in response to the rotation of the arm in a specified direction, the motivating force being transmitted to the last mentioned lever via the resilient means so as to compel said last mentioned lever to apply a braking force to the drum, and a rigid abutment fixed to one of said levers and normally spaced from the other of said levers, said abutment engaging the other of said levers only after the motivating force reaches a predetermined magnitude so as to permit the transmission of the motivating force from one to the other of said levers primarily through rigid members rather than through the resilient means.

3. A braking system for a rotational member comprising, an arm pivotally mounted for rotation about the axis of said rotational member and relative to said rotational member, a roller on said arm, and braking means including a drum fixed to said rotational member and also including a compound element having a plurality of levers, one of said levers being pivotally mounted about a fixed axis and having a cam track eccentric to and in the same plane as the path of rotation of said roller when said arm is rotated, another of said levers being pivotally connected to the first mentioned lever and interposed between said lever and the drum, compressive resilient means interposed between and connected to the levers, the above mentioned roller riding on the cam track of the first mentioned lever and motivating said lever toward the drum in response to the rotation of the arm, means to rotate said arm, the operative connections between the levers and the resilient means being such that the motivating force is transmitted from the first mentioned lever to the second mentioned lever primarily through the resilient means so as to cause the application of a varying braking force to the drum by the second mentioned lever.

4. A braking system for a rotational member comprising, an arm pivotally mounted for rotation about the axis of said rotational member and relative to said rotational member, means to rotate said arm, a roller on said arm, and braking means including a drum fixed to said rotational member and also including a compound element having a plurality of levers, one of said levers being pivotally mounted about a fixed axis and having a cam track eccentric to and in the same plane as the path of rotation of said roller when said arm is rotated, another of said levers being pivotally connected to the first mentioned lever and interposed between said lever and the drum, compressive resilient means interposed between and connected to the levers, the above mentioned roller riding on the cam track of the first mentioned lever and motivating said lever toward the drum in response to the rotation of the arm in one direction, the operative connections between the levers and resilient means being such that the motivating force is transmitted from the first mentioned lever to the second mentioned lever primarily through the resilient means so as to cause the application of a varying braking force to the drum by the second mentioned lever, and a rigid abutment fixed to one of said levers and normally spaced from the other of said levers, said abutment engaging the other of said levers when the motivating force reaches a predetermined magnitude so as to permit the transmission of said motivating force from one to the other of said levers primarily through rigid members rather than through the resilient means.

5. A braking system for a rotational member comprising, an arm pivotally mounted for rotation about the axis of said rotational member and relative to said rotational member, means to rotate said arm in a specified direction, means preventing said arm from rotating, means operative to inactivate said preventing means, a roller on said arm, and braking means including a drum fixed to said rotational member and also including a compound element having a plurality of levers, one of said levers being pivotally mounted about a fixed axis and having a cam track in the same plane as the path of rotation of said roller when said arm is rotated connected to the first mentioned lever and interposed between said lever and the drum, compressive resilient means interposed between and connected to the levers, the above mentioned roller riding on the cam track of the first mentioned lever and motivating said lever toward the drum in response to the rotation of said arm, the operative connections between the levers and the resilient means being such that the motivating force is transmitted from the first mentioned lever to the second mentioned lever primarily through the resilient means so as to cause the application of a varying braking force to the drum by the second mentioned lever, and adjusting means operatively connected to the levers, said adjusting means being adapted to vary the amount of movement of the levers necessary for the institution of braking action.

References Cited in the file of this patent

UNITED STATES PATENTS

| | | |
|---|---|---|
| 1,395,830 | Jones | Nov. 1, 1921 |
| 1,875,111 | Nieman | Aug. 30, 1932 |
| 1,890,031 | Fitts | Dec. 6, 1932 |
| 1,952,196 | Coil | Mar. 27, 1934 |
| 2,000,918 | Broms | May 14, 1935 |
| 2,226,090 | Burdett | Dec. 24, 1940 |
| 2,311,175 | Hitt | Feb. 16, 1943 |
| 2,346,756 | Hoppe | Apr. 18, 1944 |
| 2,750,006 | Super | June 12, 1956 |

FOREIGN PATENTS

| | | |
|---|---|---|
| 34,421 | France | Jan. 12, 1929 |
| 838,404 | Germany | July 8, 1949 |